W. N. OEHM & H. R. KEITHLEY.
NAILING MACHINE.
APPLICATION FILED NOV. 14, 1917.

1,286,740.

Patented Dec. 3, 1918.
3 SHEETS—SHEET 1.

Inventors:
William N Oehm
Herbert R. Keithley
By
Attys.

W. N. OEHM & H. R. KEITHLEY.
NAILING MACHINE.
APPLICATION FILED NOV. 14, 1917.
1,286,740.
Patented Dec. 3, 1918.
3 SHEETS—SHEET 2.
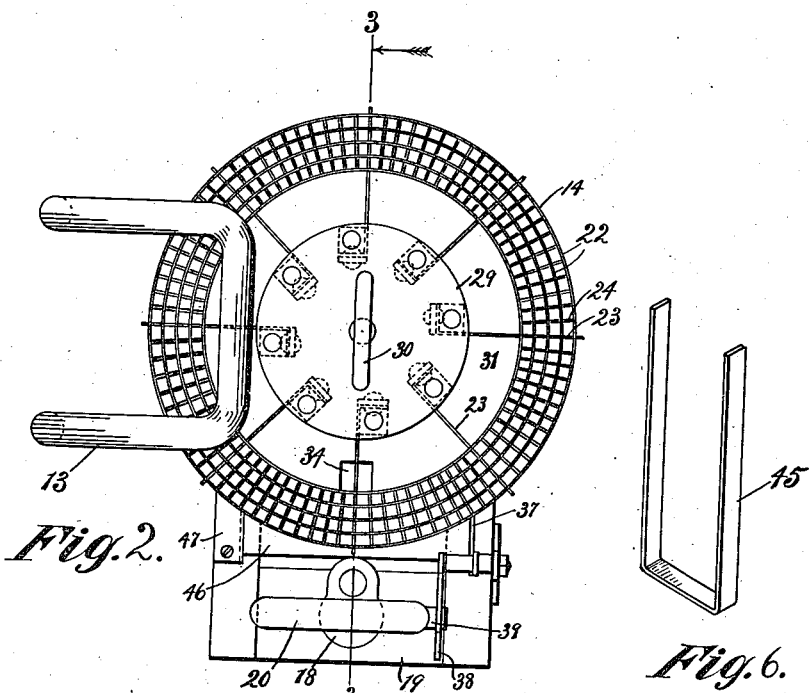
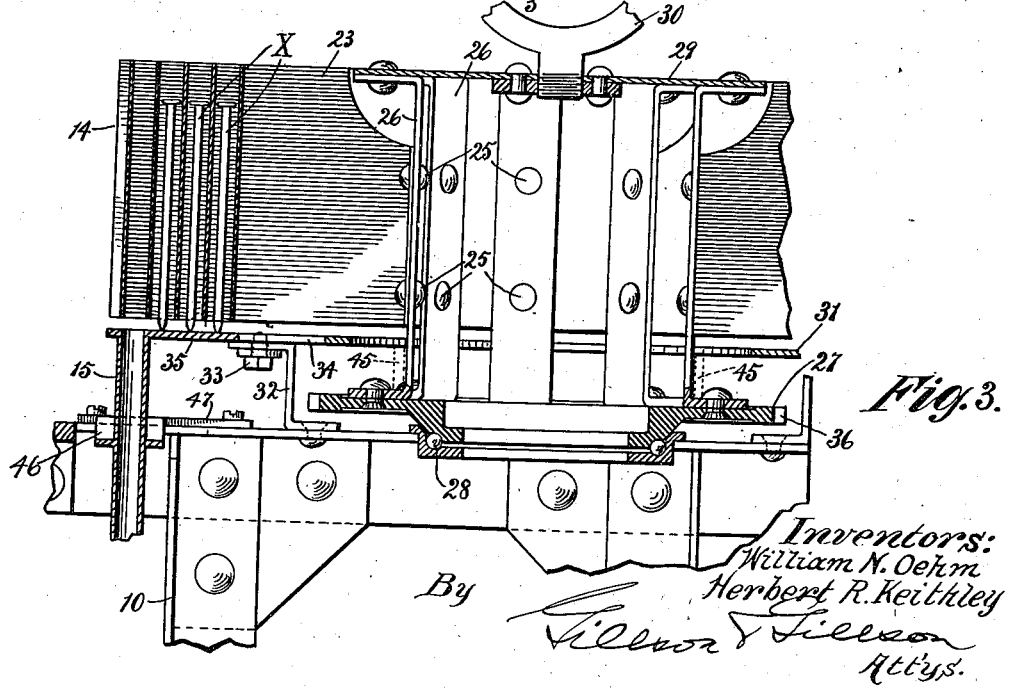

W. N. OEHM & H. R. KEITHLEY.
NAILING MACHINE.
APPLICATION FILED NOV. 14, 1917.

1,286,740.

Patented Dec. 3, 1918.
3 SHEETS—SHEET 3.

Inventors:
William N. Oehm.
Herbert R. Keithley
By
Atty's.

UNITED STATES PATENT OFFICE.

WILLIAM N. OEHM AND HERBERT R. KEITHLEY, OF MICHIGAN CITY, INDIANA, ASSIGNORS TO HASKELL & BARKER CAR CO. INC., A CORPORATION OF NEW YORK.

NAILING-MACHINE.

1,286,740.	Specification of Letters Patent.	Patented Dec. 3, 1918.

Application filed November 14, 1917. Serial No. 201,995.

*To all whom it may concern:*

Be it known that we, WILLIAM N. OEHM and HERBERT R. KEITHLEY, citizens of the United States, and residents of Michigan City, county of Laporte, and State of Indiana, have invented certain new and useful Improvements in Nailing-Machines, of which the following is a specification and which are illustrated in the accompanying drawings, forming a part thereof.

The invention relates to machines for driving nails, and is especially adapted for heavy work, such as the nailing of car flooring. Its object is to simplify the nailing operation, and to simplify and increase the efficiency of nailing machines.

An embodiment of the invention is hereinafter fully described, and is illustrated in the accompanying drawings in which—

Fig. 2 is a plan view of the machine;

Fig. 3 is a detail central vertical section through the nail drum and feed chute, on the line 3—3 of Fig. 2;

Fig. 6 is a detail of a locking bar for securing parts of the drum together when removed from the machine;

Figure 1:
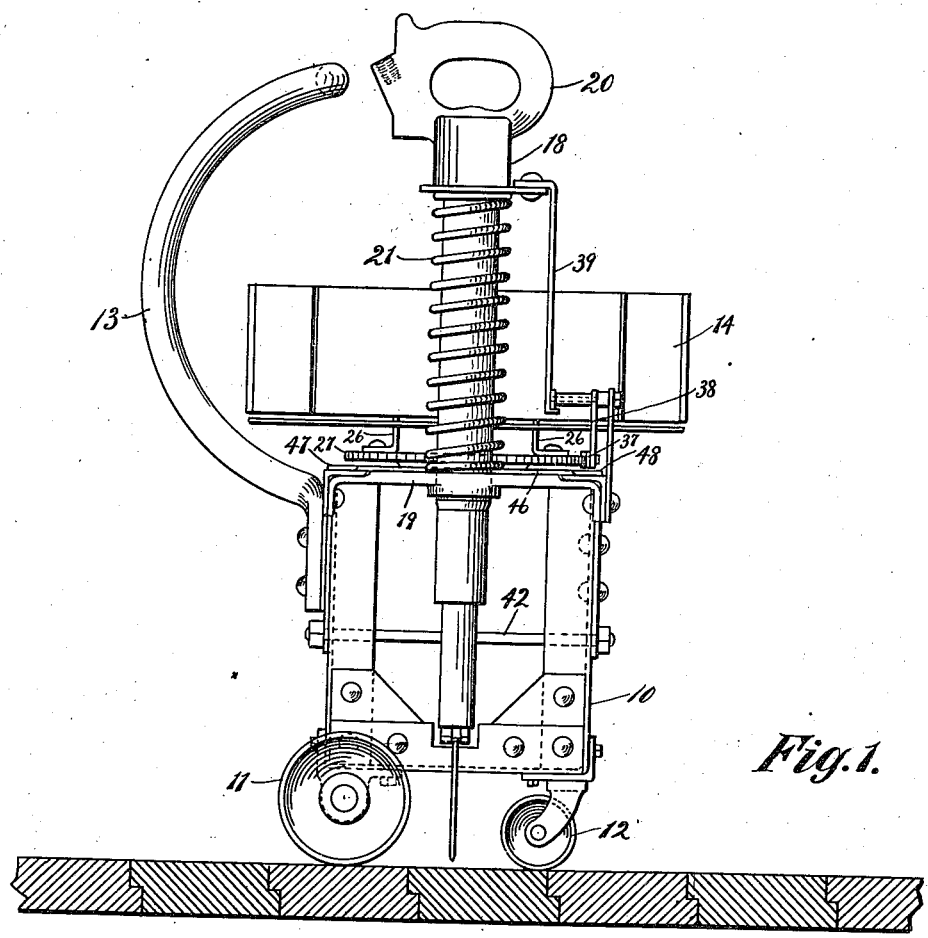
Figure 1 is a side elevation of the machine, supported on a floor, shown in section.

The machine comprises a skeleton frame 10, which may, as shown, be built up of angle bars. This frame is supported upon wheels, as 11, 12, and for convenience in guiding the apparatus some of these wheels may be in the form of casters, as shown. A handle 13 rises from the frame to suitable position to enable the operator to grasp it. The nails X are carried in a cellular rotatable drum 14 mounted on the frame, from which they are singly discharged through a chute 15 to a slotted positioning device 16, the nail being supported under the head 17 of a pneumatic hammer 18, mounted on a suitable bracket 19 extending laterally from the frame 10.

The hammer is of any approved form of known construction, and is so positioned that its handle 20 is within convenient reach of one hand of the operator while his other hand grasps the controlling handle 13. The hammer will, of course, be connected with a suitable source of air pressure, and will be provided with a controlling valve positioned for operation by a finger of the hand grasping the handle 20. These details being of common construction are not shown. The hammer 18 is slidable through the bracket 19, in order that it may be advanced to the work, and is returned to its upper position by means of a spring 21 coiled about its barrel and reacting between a shoulder thereon and the bracket 19.

Figure 5:
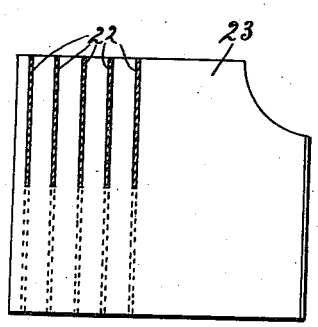
Fig. 5 is a detail, partly in section, of the nail drum.
Figure 8:
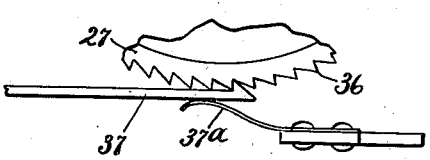
Fig. 8 is a detail of the ratchet and pawl mechanism used in the device.
Figure 4:
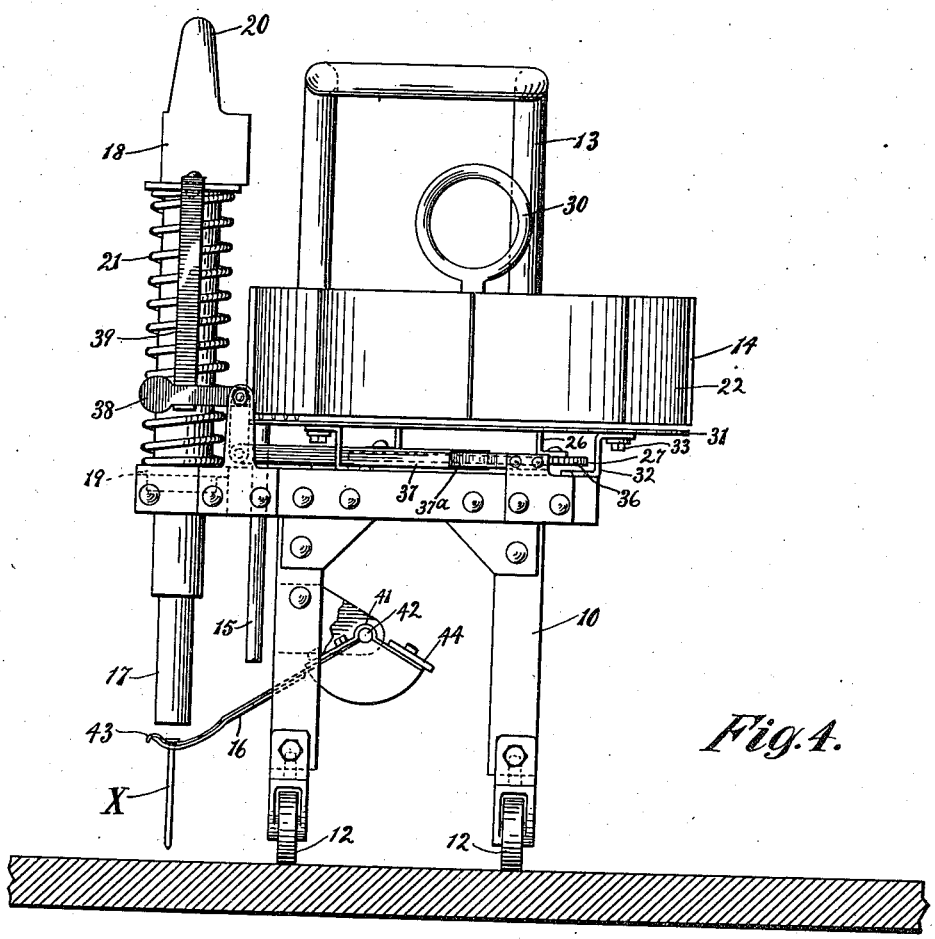
Fig. 4 is an end elevation of the machine, a floor board being shown in section.
Figure 7:
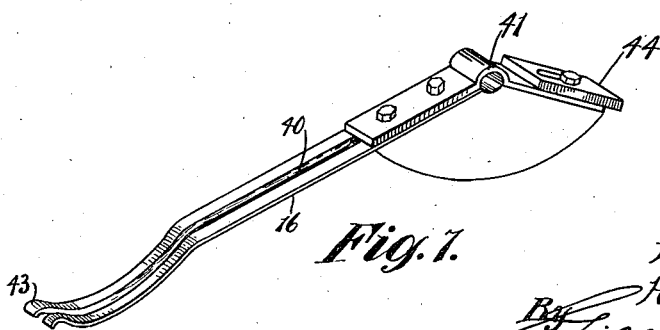
Fig. 7 is a detail of the nail-positioning device.

The drum 14 is built up of a plurality of concentric annular bands, as 22, here shown as five in number, and transverse partitions, as 23, 24, thereby forming, in the disclosed embodiment, four circular series of nail cells. The described elements of the drum are secured together, as shown in Fig. 5, by vertically slotting each through half of its width the bands and partitions being thus interlocked. Preferably the partitions 23, which, as hereinafter described, are secured to the framework of the drum, are slotted from above, the bands 22 having complementary slots from below,—these partitions thus forming supports for the bands. By slotting the intermediate partitions 24 from below and forming the complementary slots in the bands from above, these partitions are supported by the bands. The elements of the drum, may, if desired, be soldered together.

The supporting partition plates 23 are as numerous as may be required for strength, eight being shown in the drawings. These plates project inwardly and are secured, as by means of rivets 25, to uprights 26 rigidly attached at their lower ends to a ratchet wheel 27, the hub of which is supported on ball bearings 28 carried by the frame 10. To the upper ends of the uprights 26 there is attached a plate 29, to which is secured a handle 30 by which the drum may be lifted from the machine and carried. The bottom of the drum takes the form of an annular plate 31, upon which the nails X rest. This plate is not rigidly attached to the other members of the drum, but when in place on the machine rests upon supporting brackets 32 and is held against rotation by means of studs 33 in such brackets and projecting loosely through apertures in the plate.

The plate 31 is provided with a radial slot 34, which fits upon a slide plate 35 fixed upon the upper end of the chute 15 and apertured in line therewith. The plate 35 and chute 15 are movable radially as to the drum to aline the chute with the several sets of drum cells. When the chute occupies the position as shown in Fig. 3, the nails in the outer series of cells will enter it successively as the drum is rotated. This series of cells being emptied, the operator pushes in the chute to aline it successively with the several inner series of cells.

The drum is rotated with a step by step movement by means of ratchet and pawl mechanism, the ratchet teeth 36 being formed on the periphery of the wheel 27, and a pawl 37, advanced by a spring 37ª, coöperating with these teeth, being controlled by means of a bell-crank 38 actuated by a stirrup 39 attached to the hammer 18. Upon the recession of the hammer under the influence of the spring 21, the pawl is drawn backwardly to move the ratchet wheel, and with it the drum, one step, each step being the width of one of the nail cells.

The nail-positioning device 16 comprises a plate, longitudinally slotted, as shown at 40, which is attached to a hub 41 turning on a bar 42 fixed to the frame 10. The slot 40 is in line with the chute 15, so that a nail dropping from the latter enters this slot, which, however, is of less width than the diameter of the nail head. The plate 16 is normally inclined and the nail, therefore, slides toward its end, which is slightly upturned, as shown at 43, to arrest it in line with the head 17 of the hammer. As the nail is driven down by the hammer the plate 16 swings backwardly and is entirely withdrawn from engagement with the hammer before the head of the latter reaches its destination. A counterweight 44 swings the plate 16 upwardly as the hammer is withdrawn by the spring 21. This counterweight is adapted to balance the plate 16 when carrying a nail, and to adapt the machine for use in connection with nails of various sizes the counterweight is radially adjustable, as shown, with reference to the hub 41.

In practice it is desirable to provide a plurality of drums in connection with each machine, in order that while one of them is in service others may be in process of loading. The plate 31 is locked to the drum frame for the purpose of removal from the machine by means of a U-shaped bar 45, which may be thrust in between it and the ratchet wheel 27, as indicated by dotted lines in Fig. 3.

For supporting and guiding the chute 15, it is provided with a plate 46, extending laterally in each direction and riding upon the top members of the frame 10, its ends being fitted under a pair of plates 47, 48, mounted upon such member.

While a preferred embodiment of the invention is shown and described, we do not desire to be limited to the exact construction shown, as various changes may be made without departing from the scope of the invention.

We claim as our invention:—

1. In a nailing machine, in combination, a nail container, a vertical chute delivering therefrom, means for discharging nails singly from the container to the chute, a reciprocating hammer head, and a tilting plate extending downwardly toward and crossing the path of the head and adapted to receive the nails from the chute, guide them toward and releasably suspend them in the path of the head.

2. In a nailing machine, in combination, a suitable frame, a rapidly reciprocable hammer head, a counterweighted arm pivotally attached to the frame including a resilient portion normally projecting in an inclined position into the path of the head, such resilient portion being slotted from its end to receive and releasably support a nail under the head.

3. In a nailing machine, in combination, a suitable frame, a reciprocable hammer head, a counterweighted arm pivotally attached to the frame and normally projecting in a downwardly inclined position into the path of the head, such arm being slotted longitudinally through its body portion to its outer end and having its end upturned, whereby a nail entering the inner end of the slot is guided to and supported in the path of the hammer.

4. In a nailing machine, in combination, a suitable frame, a vertically movable power hammer and a rotatable cellular nail container having its cells arranged in concentric series mounted on the frame, a chute for receiving nails singly from the container and being shiftable radially as to the container, means actuated by the hammer in its vertical movement for turning the container to bring its cells successively into register with the chute, and a guide and supporting arm extending downwardly toward and crossing the path of the hammer, slotted from its end to receive, guide toward the hammer and releasably support a nail under the head, the slot extending vertically beneath the chute in all positions of the latter.

5. In a nailing machine, in combination, a frame, a detachable cellular nail container, a bottom plate for the container detachably connected thereto but removable therewith having an opening for the discharge of nails therethrough, means for locking the bottom plate against rotative movement, and means for turning the body of the container.

6. In a nailing machine, in combination, a frame, a detachable cellular nail container, a bottom plate for the container detachably connected thereto but removable therewith having an opening for the discharge of nails therethrough, means for locking the bottom plate against rotative movement, means for turning the body of the container, and means for locking together the bottom plate and body of the container.

7. In a nailing machine, in combination, a frame, a reciprocable hammer head, a cellular nail container comprising a series of concentric cylindrical shells, a central frame, a series of partitions attached to the frame and extending radially outward, the shells having slots extending from their lower edges upward for the reception of the partitions and the partitions having slots extending from their upper edges downward for the reception of the shells, a series of intermediate partitions supported by and having slotted engagement with the shells, means for discharging the nails singly from the container, and means for guiding the nails discharged from the container into the path of the head of the hammer.

8. In a nailing machine, in combination, a suitable frame, a nail container mounted thereon, means for discharging the nails singly from the container, a reciprocating hammer head, and a guide and supporting arm pivoted below the container and extending obliquely downward toward and crossing the path of the head slotted from its end and having its end curved upward, such arm forming a chute for receiving nails discharged from the container and delivering them to and releasably supporting them in the path of the hammer.

9. In a nailing machine, in combination, a vertically reciprocable hammer head, and a tilting slotted conveying plate normally extending obliquely downward across the path of the head and having its end shaped to position a nail in line with the head.

10. In a nailing machine, in combination, a frame, a rotatable nail container having a plurality of concentric series of nail-receiving cells, a bottom plate for the container having an opening for the discharge of nails therethrough, means permitting said plate to be adjusted radially with respect to the container to bring said opening into register with each series of cells successively, a reciprocating hammer head and a guide and supporting arm crossing the path of the hammer slotted from its end to receive and releasably support a nail under the head, the slot extending vertically beneath said opening in all positions of the latter.

WILLIAM N. OEHM.
HERBERT R. KEITHLEY.